US011338862B2

(12) United States Patent
McCloud et al.

(10) Patent No.: US 11,338,862 B2
(45) Date of Patent: May 24, 2022

(54) LOW-PROFILE SLIDE RAIL ASSEMBLY WITH EMBEDDED OR LAMINATED HARDPOINT CONNECTORS

(71) Applicant: Wabash National, L.P., Lafayette, IN (US)

(72) Inventors: Travis Smith McCloud, Malabar, FL (US); Andrzej Wylezinski, Lafayette, IN (US); Scott A. Storz, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 189 days.

(21) Appl. No.: 16/556,506

(22) Filed: Aug. 30, 2019

(65) Prior Publication Data

US 2020/0070894 A1 Mar. 5, 2020

Related U.S. Application Data

(60) Provisional application No. 62/725,594, filed on Aug. 31, 2018.

(51) Int. Cl.
| | |
|---|---|
| *B62D 25/20* | (2006.01) |
| *B62D 65/02* | (2006.01) |
| *B62D 33/04* | (2006.01) |
| *B62D 29/04* | (2006.01) |

(52) U.S. Cl.
CPC ......... *B62D 25/2054* (2013.01); *B62D 33/04* (2013.01); *B62D 65/02* (2013.01); *B62D 29/043* (2013.01)

(58) Field of Classification Search
CPC .... B62D 25/2054; B62D 33/04; B62D 63/06; B62D 65/02; B62D 29/041; B62D 29/043; B62D 29/048
USPC ............................................. 296/181.3, 184.1
See application file for complete search history.

(56) References Cited

U.S. PATENT DOCUMENTS

| | | | |
|---|---|---|---|
| 5,429,066 A | 7/1995 | Lewit et al. | |
| 5,664,518 A | 9/1997 | Lewit et al. | |
| 5,800,749 A | 9/1998 | Lewit et al. | |
| 5,830,308 A | 11/1998 | Reichard | |
| 5,897,818 A | 4/1999 | Lewit et al. | |
| 5,908,591 A | 6/1999 | Lewit et al. | |
| 5,934,741 A * | 8/1999 | Beukers ............... | B62D 29/046 296/181.6 |
| 6,004,492 A | 12/1999 | Lewit et al. | |

(Continued)

FOREIGN PATENT DOCUMENTS

WO 2016/137974 A1 9/2016

*Primary Examiner* — Gregory A Blankenship
(74) *Attorney, Agent, or Firm* — Faegre Drinker Biddle & Reath LLP

(57) ABSTRACT

A cargo vehicle is disclosed having a composite floor assembly with at least one embedded or laminated hardpoint connector. The composite floor assembly may comprise a plurality of transverse beams, wherein a subset of the plurality of transverse beams includes at least one embedded hardpoint connector. The composite floor assembly may comprise a plurality of transverse beams, wherein at least one hardpoint connector is laminated across a subset of the plurality of transverse beams. The embedded or laminated connector may be used to securely and removably couple other vehicle components to the composite floor assembly, such as a landing gear assembly and/or a slide rail assembly.

14 Claims, 14 Drawing Sheets

(56) References Cited

U.S. PATENT DOCUMENTS

| | | | |
|---|---|---|---|
| 6,013,213 A | 1/2000 | Lewit et al. | |
| 6,206,669 B1 | 3/2001 | Lewit et al. | |
| 6,496,190 B1 | 12/2002 | Driemeyer et al. | |
| 6,543,469 B2 | 4/2003 | Lewit et al. | |
| 6,723,273 B2 | 4/2004 | Johnson et al. | |
| 6,755,998 B1 | 6/2004 | Reichard et al. | |
| 6,869,561 B2 | 3/2005 | Johnson et al. | |
| 6,911,252 B2 | 6/2005 | Lewit et al. | |
| 7,914,034 B2 * | 3/2011 | Roush | B29C 70/521 280/656 |
| 8,016,322 B2 * | 9/2011 | Keehan | B61D 17/005 280/837 |
| 8,186,747 B2 | 5/2012 | Bloodworth et al. | |
| 8,474,871 B1 | 7/2013 | Ludwick | |
| 9,371,468 B2 | 6/2016 | Lewit | |
| 10,239,265 B2 | 3/2019 | Lewit et al. | |
| 10,919,579 B2 * | 2/2021 | McCloud | B62D 53/0842 |
| 2007/0160793 A1 * | 7/2007 | Cageao | B62D 25/2054 428/36.9 |
| 2010/0019536 A1 * | 1/2010 | Bloodworth | B62D 33/046 296/184.1 |
| 2015/0266516 A1 * | 9/2015 | Williams | B65D 90/24 296/184.1 |
| 2016/0263873 A1 | 9/2016 | Lewit | |
| 2017/0240217 A1 * | 8/2017 | Storz | B62D 33/048 |
| 2018/0037151 A1 * | 2/2018 | Bauer | B62D 65/02 |
| 2019/0047634 A1 * | 2/2019 | McCloud | B32B 5/06 |
| 2019/0061832 A1 | 2/2019 | McCloud et al. | |
| 2020/0055549 A1 * | 2/2020 | McCloud | B62D 25/2054 |
| 2020/0070894 A1 * | 3/2020 | McCloud | B62D 33/04 |
| 2020/0122783 A1 * | 4/2020 | Storz | B62D 25/2054 |

* cited by examiner

LOW-PROFILE SLIDE RAIL ASSEMBLY WITH EMBEDDED OR LAMINATED HARDPOINT CONNECTORS

CROSS-REFERENCE TO RELATED APPLICATIONS

This application claims the benefit of U.S. Provisional Application No. 62/725,594, filed Aug. 31, 2018, the entire disclosure of which is hereby expressly incorporated herein by reference.

FIELD OF THE DISCLOSURE

The present disclosure relates generally to floor structures and methods of making the same. More particularly, the present disclosure relates to composite floor structures with embedded hardpoint connectors for use in cargo vehicles and methods of making the same. The present disclosure also relates to composite floor structures with laminated hardpoint connectors for use in cargo vehicle and methods of making the same.

BACKGROUND OF THE DISCLOSURE

Cargo vehicles are used in the transportation industry for transporting many different types of cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. However, it is desired to strengthen connections between the composite materials and other vehicle components. For example, it is desired to strengthen a connection between a composite floor assembly and a landing gear assembly, a fuel tank assembly, and/or a slide rail assembly of the cargo vehicle. In addition, it is desired to maximize the amount of interior storage space of the cargo vehicle while maintaining a suitable overall height of the cargo vehicle. For example, it is desired to reduce the height of the connection between a composite floor assembly and a slide rail assembly.

SUMMARY OF THE DISCLOSURE

A cargo vehicle is disclosed having a composite floor assembly with at least one hardpoint connector. The connector may be used to securely and removably couple other vehicle components to the composite floor assembly, such as a landing gear assembly, a fuel tank assembly, and/or a slide rail assembly. The connector may be embedded in or laminated to the composite floor assembly.

According to an exemplary embodiment of the present disclosure, a cargo body is provided including a composite floor assembly having a first longitudinal end and a second longitudinal end spaced apart from the first longitudinal end along a longitudinal axis of the composite floor assembly. The cargo body further includes a slide rail assembly coupled to the composite floor assembly proximate the second longitudinal end and a first longitudinal beam coupled to the composite floor assembly. The first longitudinal beam is oriented parallel to the longitudinal axis and extends longitudinally from proximate the first longitudinal end to the slide rail assembly.

According to another exemplary embodiment of the present disclosure, a cargo body is provided including a composite floor assembly having a plurality of beams, a plurality of connectors embedded in the plurality of beams, and a slide rail assembly coupled to the plurality of connectors using a plurality of mechanical fasteners. The slide rail assembly includes a plurality of cross members coupled to a first longitudinal rail and a second longitudinal rail. The second longitudinal rail is spaced apart from the first longitudinal rail and the first and second longitudinal rails extend along a portion of the composite floor assembly.

According to a further exemplary embodiment of the present disclosure, a cargo body is provided including a composite floor assembly extending along a longitudinal axis. The composite floor assembly includes a plurality of transverse beams oriented generally orthogonal to the longitudinal axis. The cargo vehicle further includes a first connector oriented generally parallel to the longitudinal axis and spanning a first subset of beams of the plurality of beams. The first connector is coupled to the first subset of beams.

According to another exemplary embodiment of the present disclosure, a cargo body is provided including a composite floor assembly extending along a longitudinal axis and including a plurality of transverse beams oriented generally orthogonal to the longitudinal axis. The cargo body further includes first and second connectors oriented generally parallel to the longitudinal axis and spanning a first subset of beams of the plurality of beams. The first and second connectors are coupled to the first subset of beams with the second connector laterally spaced apart from the first connector. The cargo body further includes a slide rail assembly coupled to the first and second connectors with a plurality of mechanical fasteners.

According to a further exemplary embodiment of the present disclosure, a method is provided for manufacturing a composite floor assembly with at least one laminated connector. The method includes providing a mold having a plurality of interior surfaces, covering the plurality of interior surfaces with at least one outer beam skin, introducing an expandable core material into the at least one outer beam skin, expanding the core material in the at least one outer beam skin to form a composite beam, arranging the composite beam with a plurality of additional composite beams to form a composite floor assembly, the plurality of composite beams oriented generally orthogonal to a longitudinal axis of the composite floor assembly, laying a first connector across at least a subset of the plurality of composite beams, the first connector arranged generally parallel to the longitudinal axis, covering the first connector with an outer floor skin, and injecting a resin into the plurality of composite beams and the outer floor skin and around the first connector.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
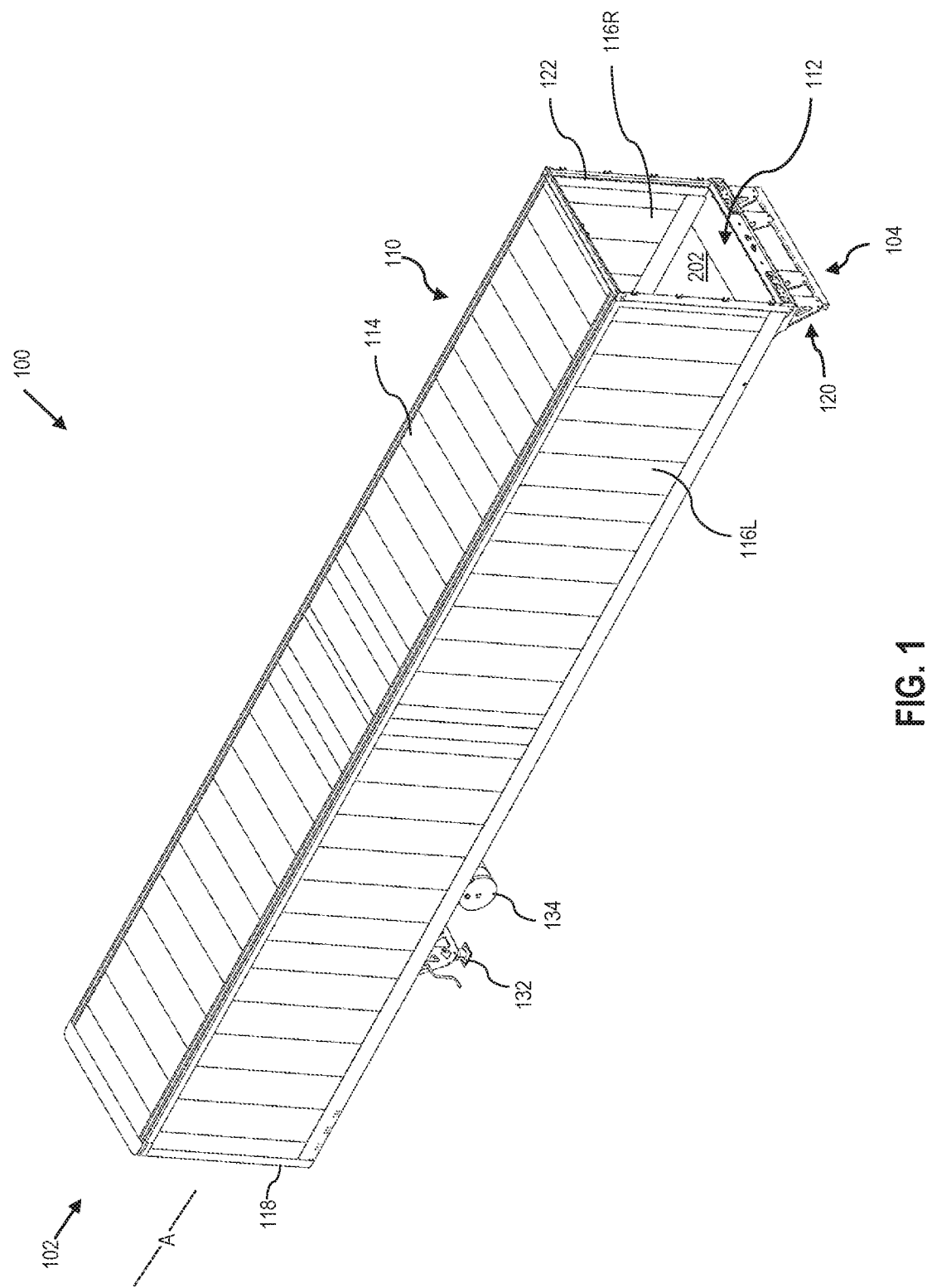
FIG. 1 is a top perspective view of an exemplary semi-trailer of the present disclosure including a composite floor assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Semi-Trailer

Referring initially to FIG. 1, a semi-trailer 100 is shown for supporting and transporting cargo. The illustrative trailer 100 extends along a longitudinal axis A from a front end 102 to a rear end 104. The illustrative trailer 100 includes a cargo body 110 with a floor assembly 112, a roof 114, a right sidewall 116R, a left sidewall 116L, a front wall or nose 118, and a rear door assembly 120 having a rear frame 122 and a door (not shown) to access the cargo body 110.

Moving from the front end 102 to the rear end 104, the trailer 100 also includes a coupler assembly 130 (see FIG. 3) configured to couple the cargo body 110 to a motorized tractor or another vehicle (not shown), a landing gear assembly 132 configured to support the cargo body 110 on the ground, a fuel tank assembly 134, and a slide rail assembly 136 (see FIG. 2) configured to couple the cargo body 110 to a rear wheel assembly (not shown). The front end 102 of the cargo body 110 may be supported atop the tractor (not shown) via the coupler assembly 130 in a transport condition or atop the landing gear assembly 132 in a stationary condition, and the rear end 104 of the cargo body 110 may be supported atop the wheel assembly (not shown) in either the transport or the stationary condition.

In the illustrated embodiment of FIG. 1, cargo body 110 of trailer 100 is an enclosed body. The cargo body 110 may be refrigerated and/or insulated to transport temperature-sensitive cargo. While the concepts of this disclosure are described in relation to a refrigerated trailer 100, it will be understood that they are equally applicable to other vehicles generally, and more specifically to conventional trailers (e.g., dry freight trailers, flatbed trailers, commercial trailers, small personal trailers) and/or box or van semi-trailers, and the like. Accordingly, those skilled in the art will appreciate that the present invention may be implemented in a number of different applications and embodiments and is not specifically limited in its application to the particular embodiments depicted herein.

Trailer 100 may have various features in common with the vehicles shown and described in International Publication No. WO 2016/137974 and U.S. Patent Application Publication No. 2017/0240217, the disclosures of which are expressly incorporated herein by reference in their entirety.

2. Composite Materials

The cargo body 110 of trailer 100 may be constructed, at least in part, of composite materials. For example, the floor assembly 112, roof 114, right sidewall 116R, left sidewall 116L, and/or nose 118 of cargo body 110 may be constructed of composite materials. As such, the floor assembly 112, roof 114, right sidewall 116R, left sidewall 116L, and/or nose 118 of cargo body 110 may be referred to herein as composite structures.

Composite materials are generally formed by combining two or more different constituents that remain separate and distinct in the final composite material. Exemplary composite materials for use in the composite cargo body 110 include fiber-reinforced plastics (FRP), for example carbon-fiber-reinforced plastics (CRP). Each composite structure may be a single, unitary component, which may be formed from a plurality of constituents or layers permanently coupled together. Other elements of the cargo body 110 may be constructed of non-composite (e.g., metallic) materials. For example, the rear door assembly 120 of the cargo body 110 may be constructed of metallic materials.

The composite construction of the cargo body 110 may present certain advantages. First, because the composite structures may lack structural metallic components, the composite cargo body 110 may have a reduced heat loss coefficient (Ua) and improved thermal efficiency. Also, the composite cargo body 110 may operate to minimize outgassing of blowing agents, minimize air loss, and minimize water intrusion. Additionally, the composite cargo body 110 may be lighter in weight than a typical metallic cargo body, which may improve fuel efficiency. Further, the composite cargo body 110 may have fewer metallic structures than a typical cargo body, which may make the cargo body 110 less susceptible to corrosion. Also, the composite cargo body 110 may include fewer parts than a typical metallic cargo body, which may simplify construction, reduce inventory, and reduce variation in manufacturing. Further, the composite cargo body 110 may be suitable for use with sensitive cargo, including foodstuffs, because the composite materials may be inert to avoid reacting with the cargo and other materials and because the composite materials may be easy to clean and maintain to ensure proper hygiene. As a result, the composite cargo body 110 may qualify as "food grade" equipment.

The composite structures of the present disclosure may contain one or more structural supports or preforms. The preform may have a structural core that has been covered with an outer fabric layer or skin. The outer skin may be stitched or otherwise coupled to the underlying core and/or any surrounding layers. The core may be extruded, pultruded, or otherwise formed into a desired shape and cut to a desired length. In an exemplary embodiment, the core is a polyurethane foam material or another foam material, and the outer skin is a non-woven spun bond polyester material, a fiberglass fabric, or another suitable material. Advantageously, in addition to its structural effect, the foam core may have an insulating effect in certain applications, including refrigerated trucking applications. Exemplary preforms include PRISMA® preforms provided by Compsys, Inc. of Melbourne, Fla.

Both the core and the outer skin of the preform may be selected to accommodate the needs of the particular application. For example, in areas of the final structure requiring more strength and/or insulation, a low-density foam may be replaced with a high-density foam or a hard plastic block. The individual preforms may also be sized, shaped, and arranged in a manner that accommodates the needs of the particular application. For example, in areas of the final structure requiring less strength, the preforms may be relatively large in size, with the foam cores spanning relatively large distances before reaching the surrounding outer skins. By contrast, in areas of the final structure requiring more strength, the preforms may be relatively small in size, with the foam cores spanning relatively small distances before reaching the surrounding outer skins. Stated differently, the preforms may be shaped as relatively wide panels in areas of the final structure requiring less strength and as relatively narrow support beams in areas of the final structure requiring more strength.

The composite structures of the present disclosure may also contain one or more reinforcing materials or layers around the preforms. Each reinforcing layer may contain reinforcing fibers and may be capable of being impregnated and/or coated with a resin, as discussed further in Section 8 below. Suitable fibers include carbon fibers, glass fibers, cellulose, or polymers, for example. The fibers may be present in fabric form, which may be mat, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Ala. Exemplary fabrics include the E-LM 1810 fiberglass fabric with 0° unidirectional fibers, the E-LTM 3610 fiberglass fabric with 0°/90° fibers, and the E-LTM 2408 fiberglass fabric with 0°/90° fibers, for example.

According to an exemplary embodiment of the present disclosure, a plurality of different reinforcing layers may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

3. Composite Floor Assembly

Figure 2:
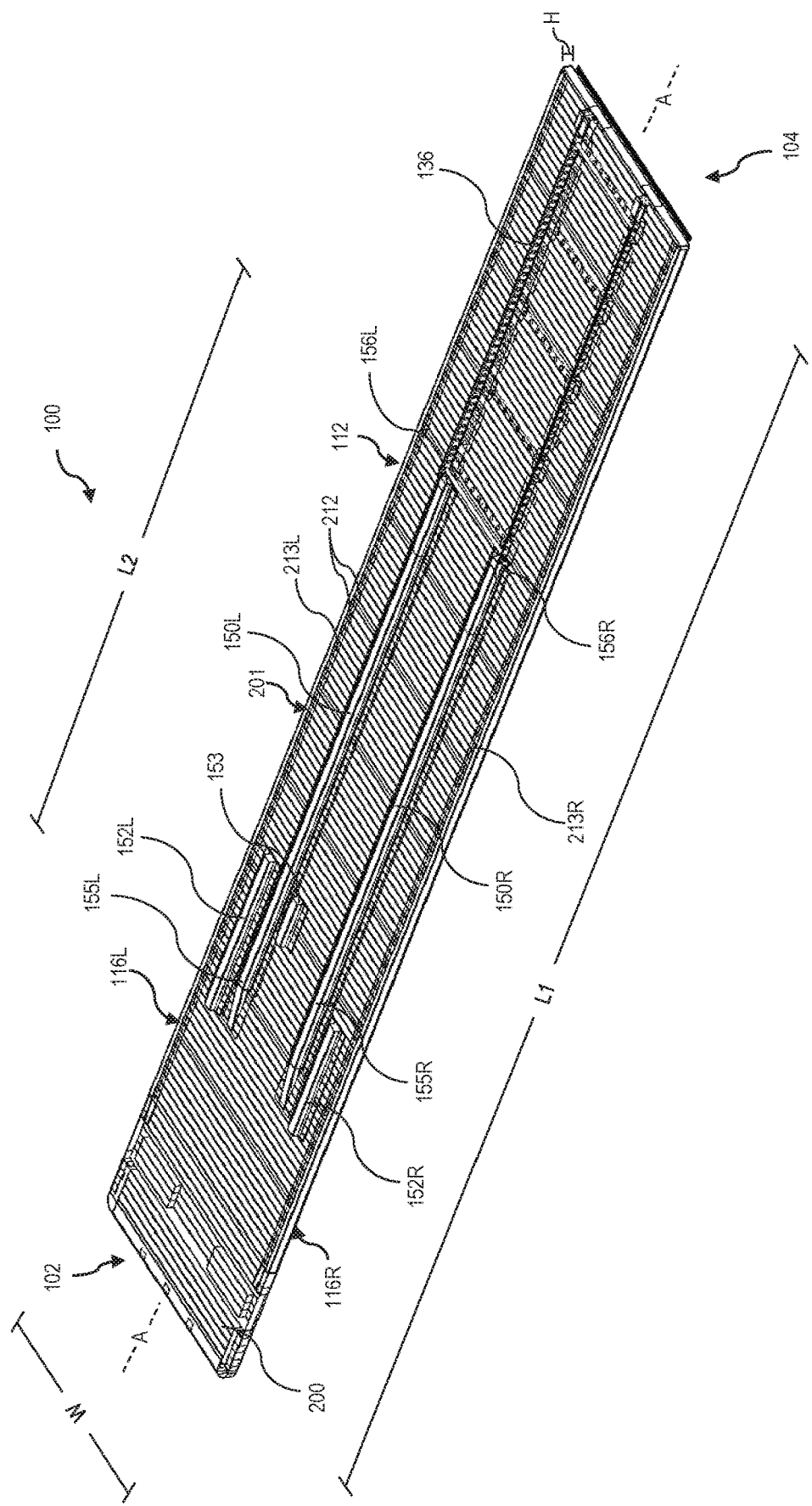
FIG. 2 is a bottom perspective view of the exemplary semi-trailer of FIG. 1, shown with a slide rail assembly coupled to the composite floor assembly.

Floor assembly 112 is shown in more detail in FIG. 2. The illustrative floor assembly 112 includes a lower surface 200 that faces downward toward the ground when in use. The illustrative floor assembly 112 also includes an upper surface or platform 202 (see FIG. 1) that faces upward when in use to support cargo or other objects. The illustrative floor assembly 112 has a generally rectangular outer perimeter 201 with a width W, a length $L_1$, and a height H between the lower surface 200 and the upper surface 202 (see FIG. 1), although this shape may vary. As discussed in Section 2 above and Section 7 below, floor assembly 112 may be a composite structure that is constructed, at least in part, of composite materials.

As further shown in FIG. 2, the exemplary floor assembly 112 includes a plurality of transverse composite beams 212. Illustratively, each of the plurality of transverse composite beams 212 is oriented generally orthogonal to longitudinal axis A. More specifically, each of the plurality of transverse composite beams 212 extend in a direction perpendicular to longitudinal axis A with longitudinal ends 213R, 213L positioned along outer perimeter 201 of floor assembly 112 and adjacent to sidewalls 116R, 116L, respectively. The individual transverse composite beams 212 may be constructed in accordance with Section 2 above and Section 7 below. Specifically, each transverse composite beams 212 may be a preform of a structural core wrapped in an outer skin.

Figure 3:
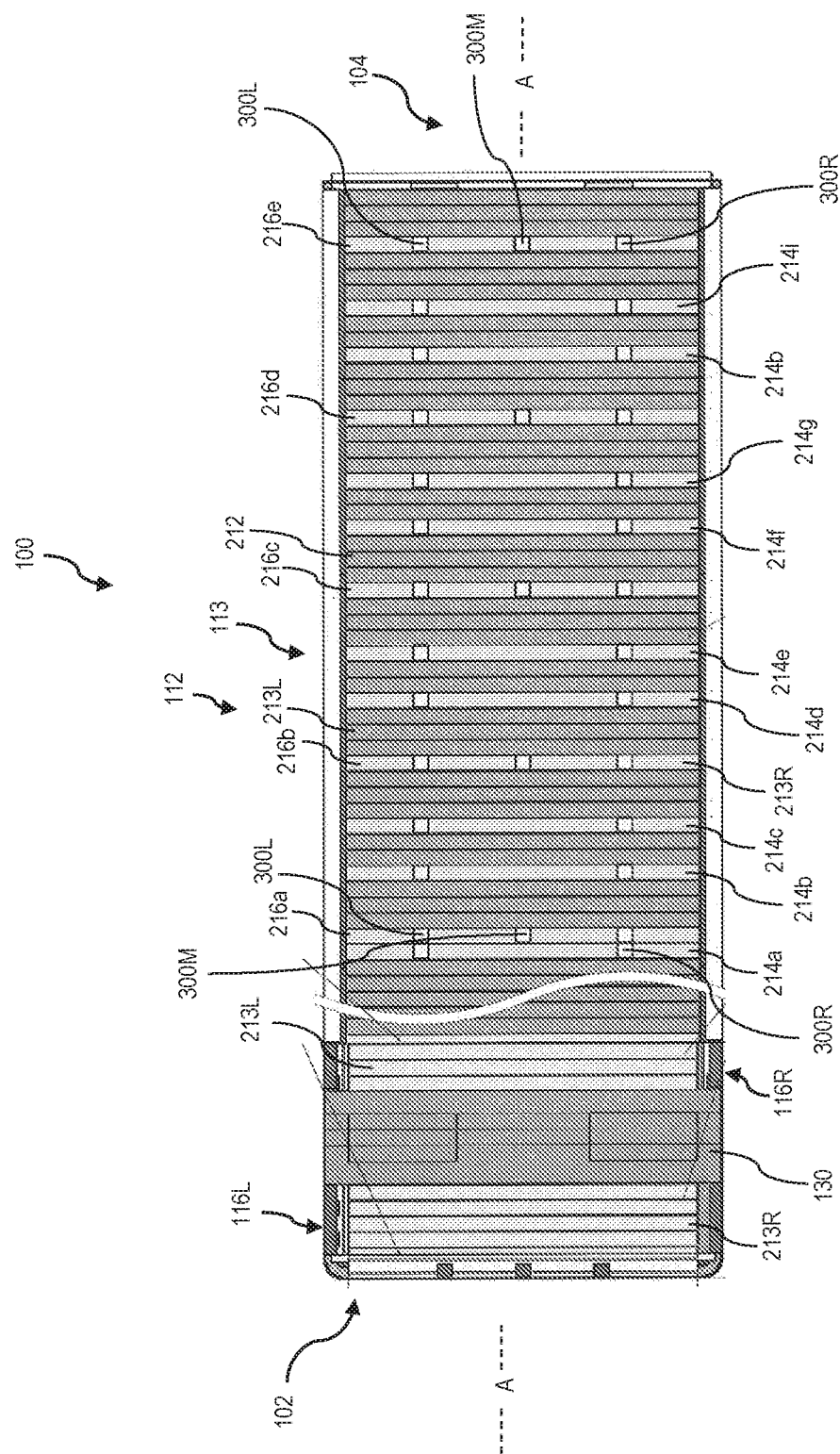
FIG. 3 is a partial bottom plan view of the composite floor assembly of FIG. 1, shown with a plurality of transverse composite beams and a plurality of connectors embedded in a first subset of the plurality of composite beams
Figure 4:
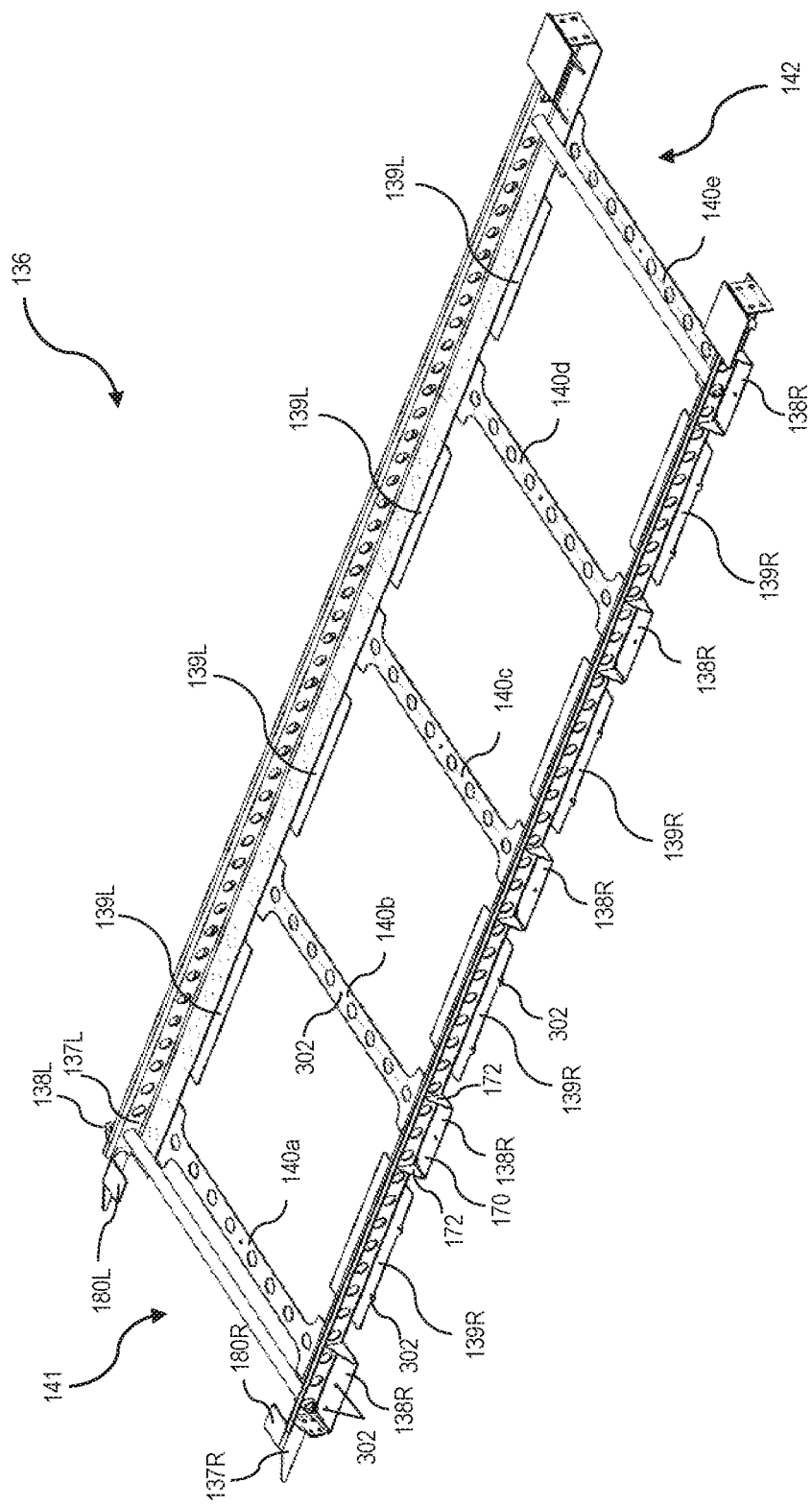
FIG. 4 is a perspective view of the slide rail assembly of FIG. 2.

Turning now to FIG. 3, the plurality of transverse composite beams 212 includes a first subset of rearward beams 214, specifically rearward beams 214a-i, and a second subset of rearward beams 216, specifically rearward beams 216a-e. In the exemplary embodiment shown, some of the beams 214, 216 are longitudinally spaced apart from one another along longitudinal axis A. More specifically, some of the beams 214, 216 are intermixed with and separated by the remainder of the plurality of transverse composite beams 212 such that some of the beams 214, 216 are longitudinally spaced apart along a rear portion 113 of cargo body 110. Others of the beams 214, 216, specifically beams 214a, 216a, are positioned immediately adjacent to each other.

As discussed in Section 2 above, the individual transverse composite beams 212, 214, 216 may be sized, shaped, and arranged in a manner that accommodates the needs of the particular application. For example, a relatively large number of small, closely-spaced beams may be used for high-weight/high-strength applications, whereas a relatively small number of large and/or spaced-apart beams may be used for low-weight/low-strength applications.

4. Longitudinal Beams

As shown in FIG. 2, cargo body 110 includes a first and second longitudinal main beam 150L, 150R extending downward from lower surface 200 of floor assembly 112 along a length $L_2$ of cargo body 110 parallel to longitudinal axis A and oriented generally orthogonal to the plurality of transverse composite beams 212, 214, 216. Longitudinal main beams 150L, 150R are illustratively positioned laterally inward of longitudinal ends 213R, 213L of the plurality of composite beams 212, 214, 216, which correspond to sidewalls 116R, 116L of cargo body 110 (see FIG. 1). In the exemplary embodiment shown, longitudinal main beams 150L, 150R are positioned laterally intermediate longitudinal axis A and the respective longitudinal end 213R, 213L. That said, the lateral position of longitudinal main beams 150L, 150R relative to longitudinal axis A and longitudinal ends 213R, 213L lateral sides of cargo body 110 may be adjusted depending on the specific application and components of cargo body 110. Furthermore, the individual longitudinal main beams 150L, 150R may be constructed in accordance with Section 2 above and Section 7 below. Specifically, each longitudinal main beam 150L, 150R may be a preform of a structural core wrapped in an outer skin.

Longitudinal main beams 150L, 150R extend along length $L_2$ of floor assembly 112. As shown in FIG. 2, length $L_2$ is a portion of overall length $L_1$ of cargo body 110. More specifically, longitudinal main beams 150L, 150R extend along longitudinal axis A from proximate front end 102 of cargo body 110 to slide rail assembly 136. In the exemplary embodiment shown, longitudinal main beams 150L, 150R extend longitudinally from a front longitudinal end 155L, 155R to a rear longitudinal end 156L, 156R. Front longitudinal end 155L, 155R is positioned rearward of coupler assembly 130 and proximate landing gear assembly 132 without extending entirely to front end 102 of trailer 100. Rear longitudinal end 156L, 156R is positioned adjacent slide rail assembly 136 without extending entirely to rear end 104 of cargo body 110. An advantage, among others, of longitudinal main beams 150L, 150R is that longitudinal main beams 150L, 150R provide stiffness along length $L_2$ of floor assembly 112.

In the exemplary embodiment shown, cargo body 110 includes additional longitudinal beams 152L, 152R, 153. Longitudinal beams 152L, 152R, 153 extend along a shorter length of floor assembly 112 than length $L_2$ of longitudinal main beams 150L, 150R. More specifically, longitudinal beams 152L, 152R, 153 are positioned proximate front end 102 of cargo body 110 without extending entirely to coupler assembly 130 or rear end 104 of cargo body 110. In the exemplary embodiment shown, longitudinal beams 152L, 152R, 153 provide a coupling surface for components of cargo body 110 such as, for example, landing gear assembly 132 and fuel tank assembly 134 (see FIG. 1). Another advantage, among others, of longitudinal beams 152L, 152R, 153 is that longitudinal beams 152L, 152R, 153 provide additional stiffness to floor assembly 112 near front end 102 (i.e., the area of landing gear assembly 132 and fuel tank assembly 134).

Similar to the transverse composite beams 212, the individual longitudinal beams 150L, 150R, 152L, 152R, 153 may be sized, shaped, and arranged in a manner that accommodates the needs of the particular application. For example in another embodiment, longitudinal beams 152L, 152R, 153 are sized and arranged to accommodate an additional fuel tank assembly or other accessory positioned, for example, laterally opposite fuel tank assembly 134.

5. Embedded Hardpoint Connectors

Figure 5:
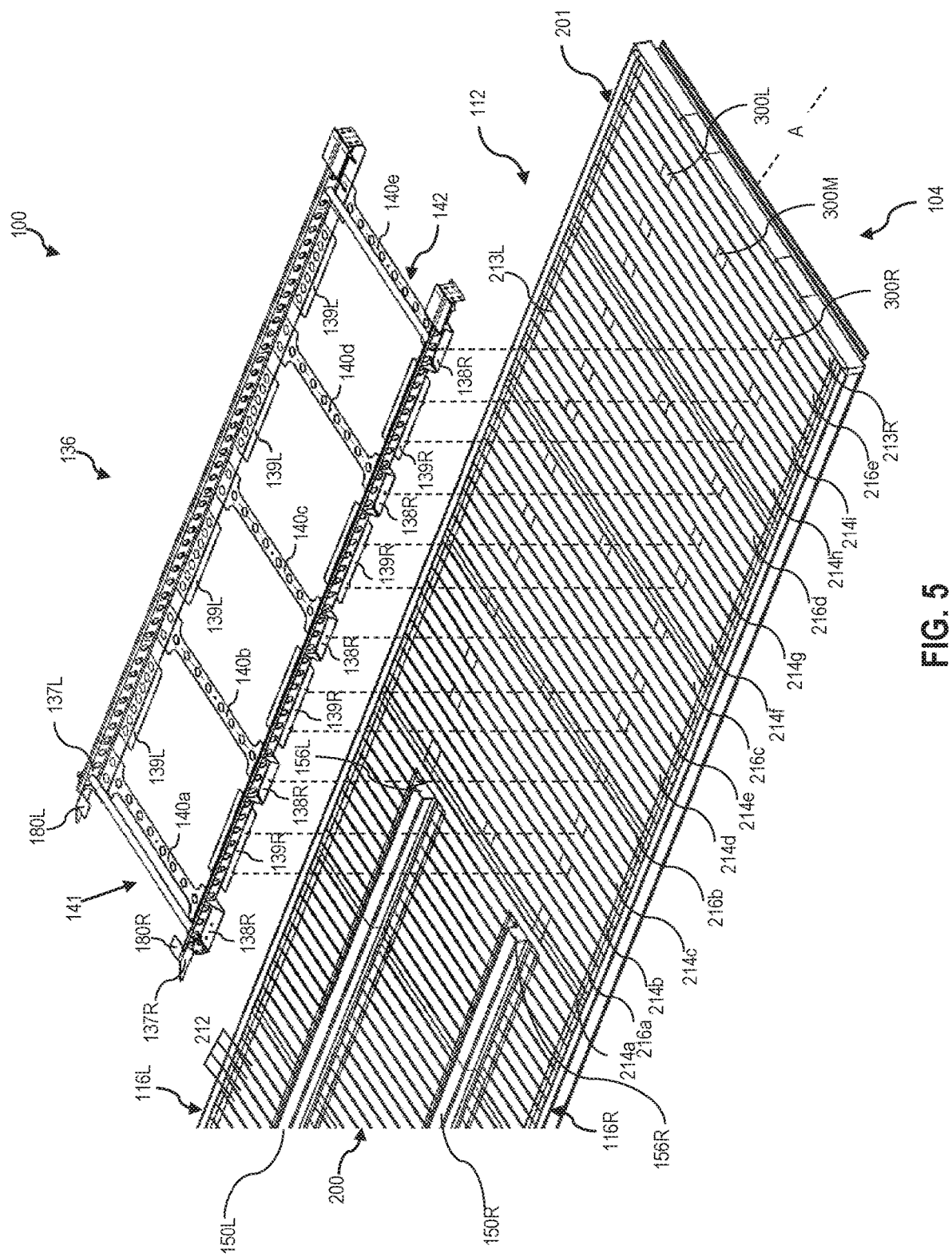
FIG. 5 is a partial perspective exploded view of a rear portion of the composite floor assembly of FIG. 1, with the slide rail assembly shown coupled to a first subset of the plurality of connectors embedded in the composite floor assembly.
Figure 6:
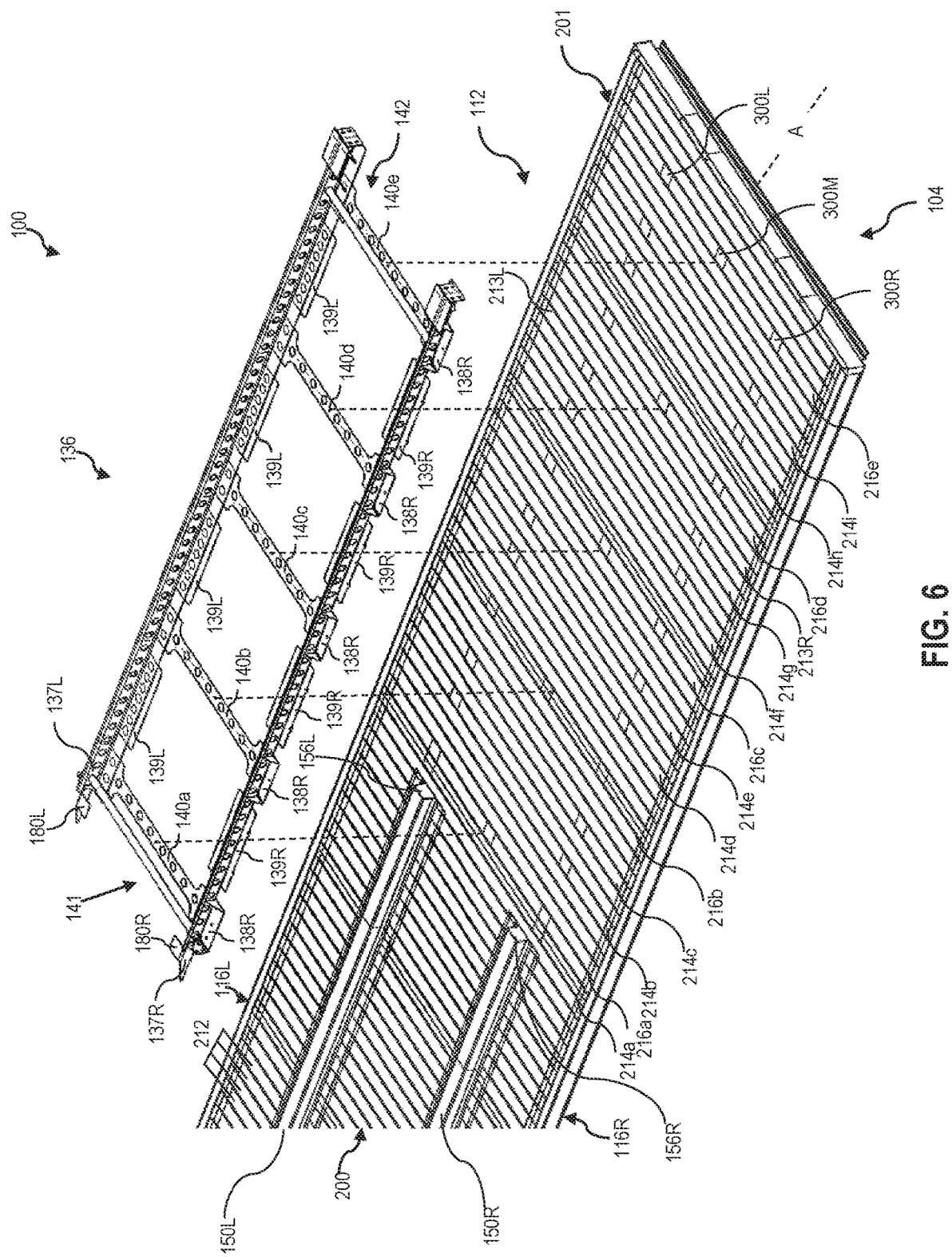
FIG. 6 is a partial perspective exploded view of the rear portion of the composite floor assembly of FIG. 1, with the slide rail assembly shown coupled to a second subset of the plurality of connectors embedded in the composite floor assembly.
Figure 7:
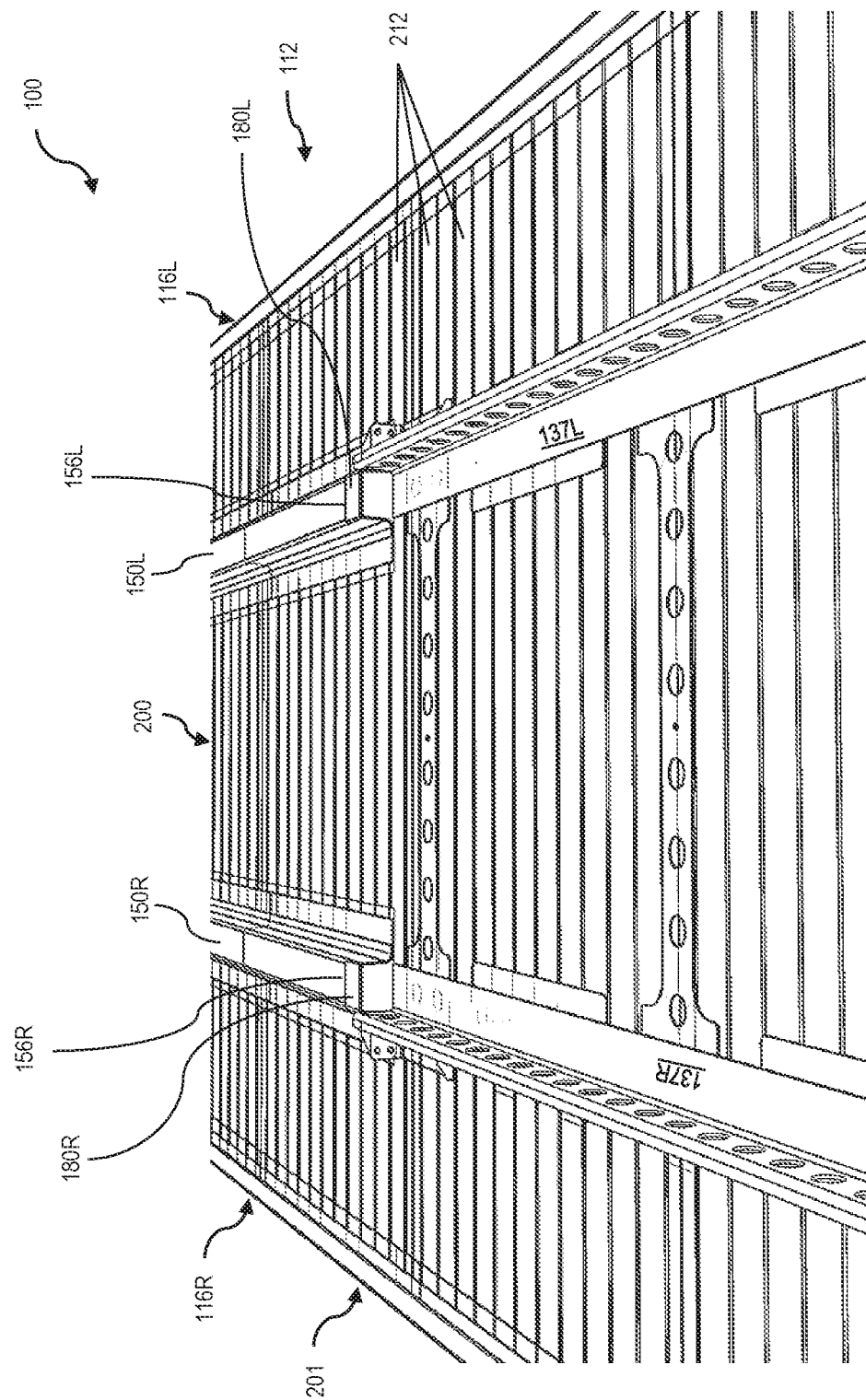
FIG. 7 is partial perspective view of the exemplary semi-trailer of FIG. 1, shown with a plurality of main longitudinal beams coupled to the composite floor assembly and positioned adjacent the slide rail assembly.
Figure 8:
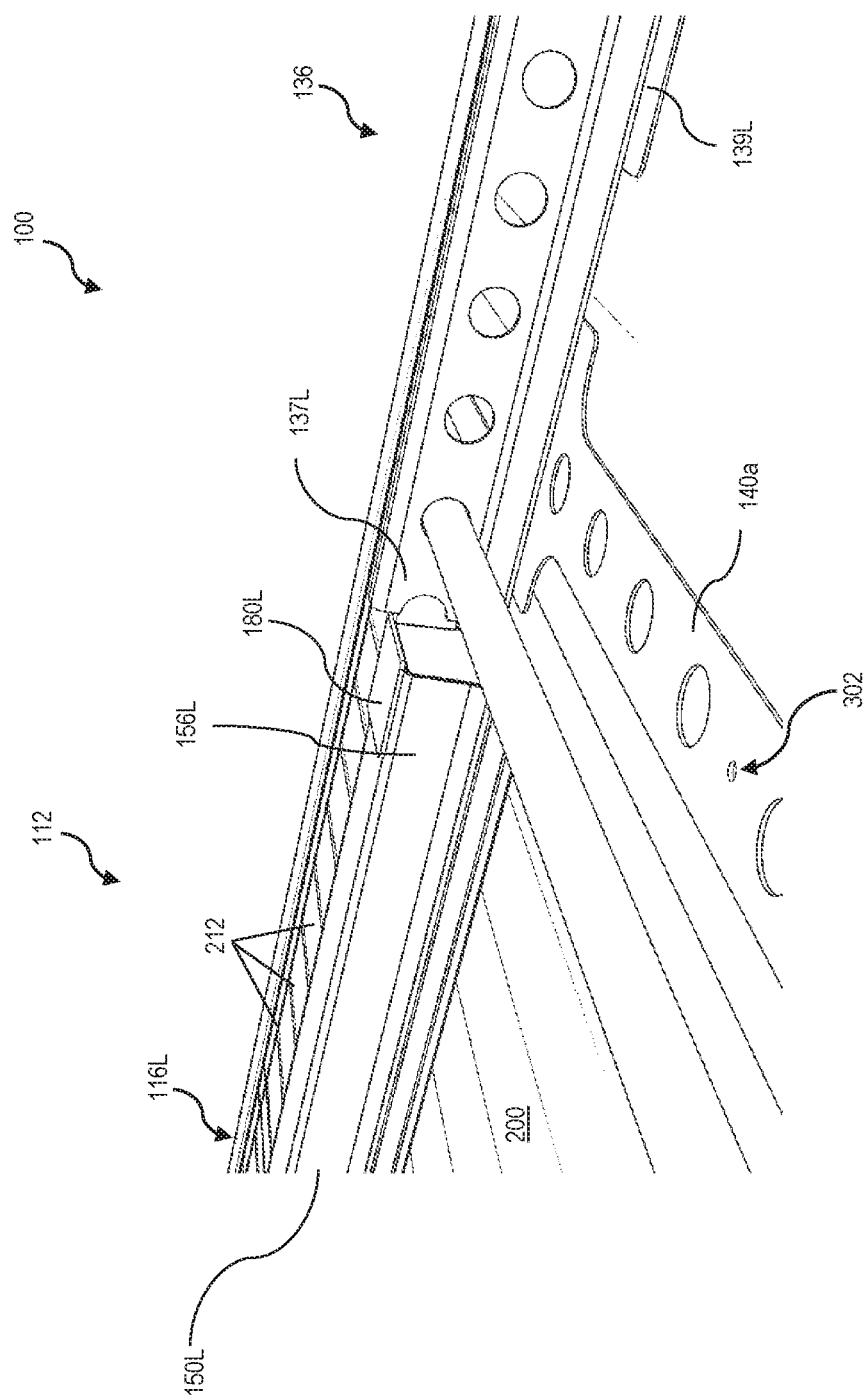
FIG. 8 is a partial perspective view of the exemplary semi-trailer of FIG. 1, shown with an end of one of the plurality of main longitudinal beams adjacent an end of a side rail of the slide rail assembly.

Floor assembly 112 may include one or more embedded hardpoint connectors 300, as shown in FIG. 3. Connectors 300 may serve as fasteners or anchors for mechanically coupling other components of trailer 100 to floor assembly 112, such as rear door assembly 120 (FIG. 1), a coupler assembly 130, landing gear assembly 132 (FIG. 1), fuel tank assembly 134 (FIG. 1), slide rail assembly (FIGS. 5 and 6), and/or a suspension assembly (not shown), for example.

Each connector 300 may be configured to receive one or more mechanical fasteners (not shown) from the adjacent component. Suitable mechanical fasteners include bolts, screws, rivets, and nails, for example. In certain embodiments, connectors 300 may include pre-tapped holes (not shown) capable of receiving the mechanical fasteners. Depending on the needs of the particular application, the mechanical fasteners may be used alone or in combination with structural adhesives. The mechanical fasteners may be desired when the adjacent component will be susceptible to peeling, whereas structural adhesive may be desired when the adjacent component will be susceptible to shear loads. When used alone, the mechanical fasteners may facilitate efficient and inexpensive assembly and repairs of trailer 100. When used in combination with structural adhesive, the mechanical fasteners may also serve as clamps to stabilize trailer 100 during curing of the structural adhesive.

In the exemplary embodiment of FIG. 3, connectors 300 are illustratively embedded in a select group of beams of the plurality of transverse composite beams 212. More specifically, connectors 300 are embedded in beams 214, 216, which comprise a first and second subset of the plurality of beams 212. The remaining beams 212 may lack embedded connectors 300. As referenced above, one or more beams 212 lacking embedded connectors 300 may be arranged between some of the beams 214, 216 having embedded connectors 300 such that some of the connectors 300 are longitudinally spaced apart along cargo body 110. Others of the beams 214, 216, specifically beams 214a, 216a, may be positioned immediately adjacent to each other, such that others of the embedded connectors 300 are longitudinally adjacent to each other.

Illustratively, connectors 300 comprise a generally planar body or plate and are embedded in lower surface 200 of composite floor assembly 112, more specifically within beams 214, 216 themselves. In an alternative embodiment, connectors 300 are embedded in another surface or span two or more surfaces of beams 214, 216. Accordingly, connectors 300 may also be C-shaped, T-shaped, pi-shaped, bent, tubular, or other suitable shapes. Connectors 300 may be embedded in beams 214, 216 in accordance with Section 7 below.

In the exemplary embodiment shown in FIG. 3, each beam 214, 216 includes a plurality of embedded connectors 300, illustratively between two and three embedded connectors 300. Generally, connectors 300 are spaced apart from one another along the longitudinal length of each beam 214, 216. For example, connectors 300 may be positioned intermediate longitudinal axis A and a respective longitudinal end 213L, 213R of beams 214, 216. More specifically, connectors 300 are positioned laterally inward of longitudinal ends 213L, 213R of beams 214, 216 (corresponding to the lateral sidewalls 116L, 116R of cargo body 110 (see FIG. 1)).

In the exemplary embodiment shown, beams 214 include connectors 300L, 300R and beams 216 include connectors 300L, 300M, 300R. Regarding beams 214, 216, connectors 300L, 300R are positioned laterally intermediate longitudinal axis A and a respective longitudinal end 213L, 213R of beams 214, 216. Regarding beams 216, connectors 300M are positioned laterally intermediate connectors 300L, 300R. More specifically, connectors 300M are positioned along longitudinal axis A when beams 216 are arranged as part of floor assembly 112. That said, the position and number of connectors 300 along the length of each beam 214, 216 may be adjusted for the required application. Moreover, the subsets of beams 214, 216 with embedded connectors 300 may be more or fewer than the number of selected beams 214, 216 shown in FIG. 3.

Connectors 300 may be constructed of metallic materials (e.g., steel, aluminum, titanium), polymeric materials, wood, or composite materials. In certain embodiments, connectors 300 are constructed of materials which are dissimilar from the composite material used to construct the corresponding beams. Connectors 300 may be fabricated by extrusion, pultrusion, sheet forming, roll forming, and/or casting, for example. Connectors 300 may also be single-piece or multi-piece constructs. For multi-piece constructs, the pieces may be welded, mechanically fastened, adhered, snap-fit, or otherwise coupled together.

6. Slide Rail Assembly

Referring next to FIGS. 4-8, an exemplary slide rail assembly 136 is provided for use with beams 214, 216 of floor assembly 112. As discussed above, slide rail assembly may be used to couple cargo body 110 to a rear wheel assembly (not shown).

As shown in FIG. 2, slide rail assembly 136 extends downwardly from lower surface 200 along a portion of floor assembly 112. Illustratively, slide rail assembly 136 extends along longitudinal axis A from a first end 141 to a second end 142. In the exemplary embodiment shown, second end 142 is positioned proximate rear end 104 of trailer 100. Second end 142 may extend all the way to rear end 104. First end 141 is positioned proximate rear longitudinal ends 156L, 156R of main longitudinal beams 150L, 150R. In certain embodiments, and as described further below, slide rail assembly 136 may at least partially overlap main longitudinal beams 150L, 150R.

Slide rail assembly 136 includes side rails 137L, 137R extending parallel to longitudinal axis A (see FIG. 2). As shown in the exemplary embodiment of FIG. 2, slide rail assembly 136 extends along a portion of floor assembly 112. Side rail 137R is spaced apart from side rail 137L. Each side rail 137L, 137R is generally aligned with the corresponding main longitudinal beam 150L, 150R, to form a substantially continuous support structure 137L, 150L beneath the left side of floor assembly 112 and a substantially continuous support structure 137R, 150R beneath the right side of floor assembly 112 (see FIG. 7). Each side rail 137L, 137R may include a corresponding flange 180L, 180R that at least partially overlaps main longitudinal beams 150L, 150R, as noted above. The illustrative flanges 180L, 180R are flat and rest beneath the rear longitudinal ends 156L, 156R of the corresponding main longitudinal beams 150L, 150R, but it is also within the scope of the present disclosure for flanges 180L, 180R to be L-shaped or U-shaped, for example, to wrap around main longitudinal beams 150L, 150R.

Slide rail assembly 136 further includes a plurality of cross members 140, specifically cross members 140a-e, that are coupled to side rails 137L, 137R. Cross members 140a-e are oriented generally perpendicular to longitudinal axis A and generally parallel to the plurality of transverse composite beams 212. Cross members 140a-e span the lateral distance of floor assembly 112 between side rails 137L, 137R. Cross members 140a-e are generally flat and coplanar with lower surface 200 of floor assembly 112.

Side rails 137L, 137R include a plurality of mounting brackets 138, 139. Mounting brackets 138, specifically mounting brackets 138L, 138R, couple slide rail assembly 136 to connectors 300. More specifically, mounting brackets 138L couple side rail 137L to connectors 300L (see FIGS. 3, 5, and 6) and mounting brackets 138R couple side rail 137R to connectors 300R (see FIGS. 3, 5, and 6). Similarly, mounting brackets 139, specifically mounting brackets 139L, 139R, couple slide rail assembly 136 to connectors 300. More specifically, mounting brackets 139L couple side rail 137L to connectors 300L and mounting brackets 139R couple side rail 137R to connectors 300R. In the exemplary embodiment shown, mounting brackets 139L, 139R are flat and coplanar with lower surface 200 of floor assembly 112. Conversely, mounting brackets 138L, 138R are generally U-shaped with a flat central portion 170 that is coplanar with lower surface 200 of floor assembly 112 and outer arms 172 that extend downwardly from lower surface 200 along side rails 137L, 137R. Mounting brackets 138, 139 are coupled to connectors 300L, 300R by inserting a plurality of mechanical fasteners (not shown) through holes 302 in mounting brackets 138, 139 and into connectors 300L, 300R. In another embodiment, mounting brackets 138, 139 may be further coupled to connectors 300L, 300R using a structural adhesive to enhance the mechanical connection. Cross members 140a-e are likewise coupled to connectors 300. More specifically, cross members 140a-e are coupled to connectors 300M by inserting a plurality of mechanical fasteners (not shown) through holes 302 in cross members 140a-e and into connectors 300M. An advantage, among others, of coupling slide rail assembly 136 to lower surface 200 of floor assembly 112 (as opposed to main longitudinal beams 150L, 150R) is that the lower surface 200 of floor assembly 112 can be lowered closer to the ground, thereby allowing the overall height of cargo body 110 (i.e., the distance between the ground and roof 114 of FIG. 1) to be maintained while increasing the interior storage space of cargo body 110 (i.e., the distance between floor assembly 112 and roof 114 of FIG. 1). Another advantage, among others, of coupling slide rail assembly 136 to lower surface 200 of floor assembly 112 (as opposed to main longitudinal beams 150L, 150R) is that lower surface 200 of floor assembly 112 can be lowered closer to the ground, thereby allowing the overall height of cargo body 110 (i.e., the distance between the ground and roof 114 of FIG. 1) to be maintained while increasing the amount of insulation in roof 114 or in floor assembly 12 by increasing the thickness of floor assembly 112 (i.e., the distance between lower surface 200 and upper surface 202).

7. Composite Molding Process with Embedded Connectors

Figure 9:
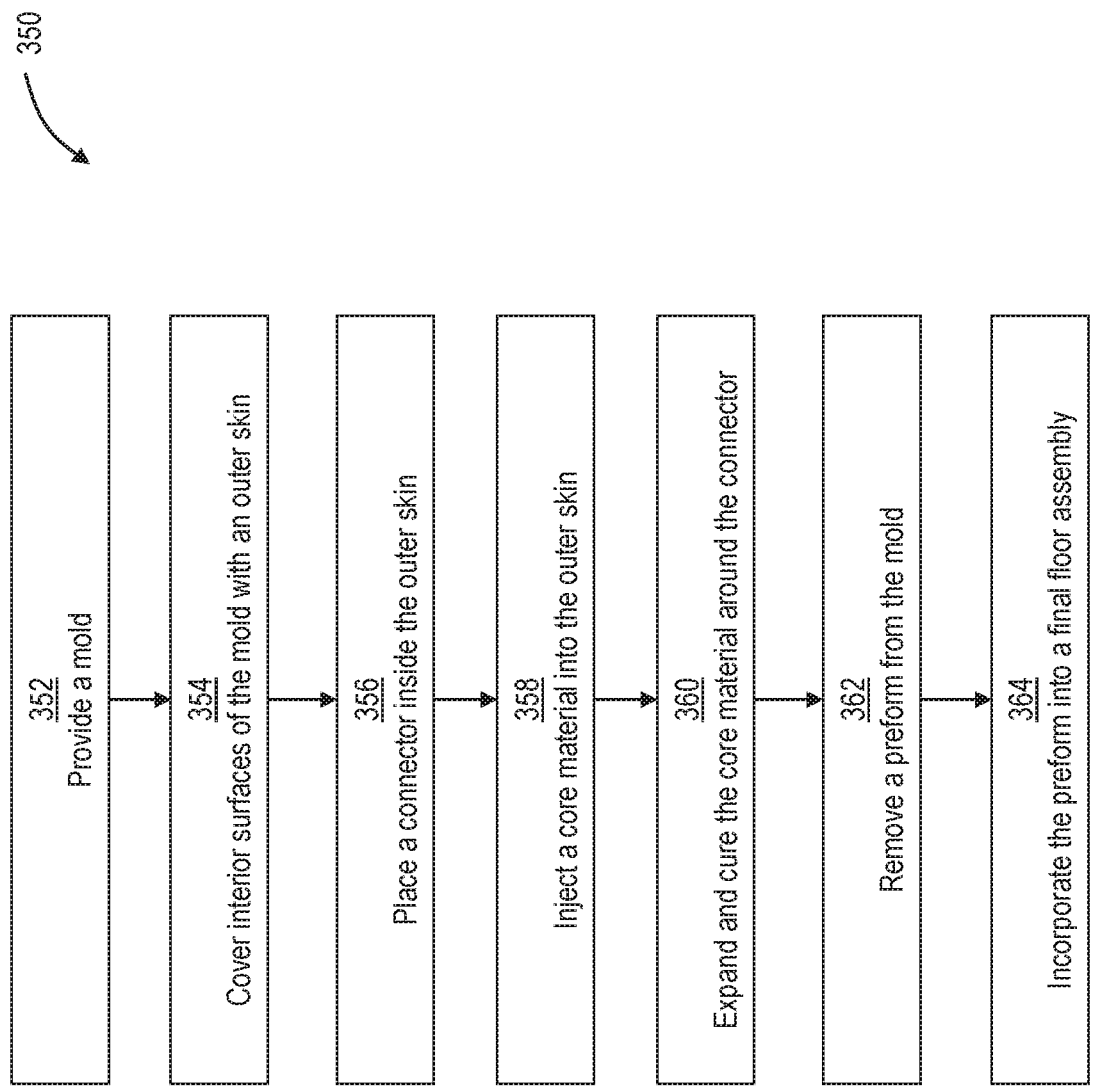
FIG. 9 is a flow chart of an exemplary method for manufacturing the composite floor assembly of the FIG. 1.
Figure 10:
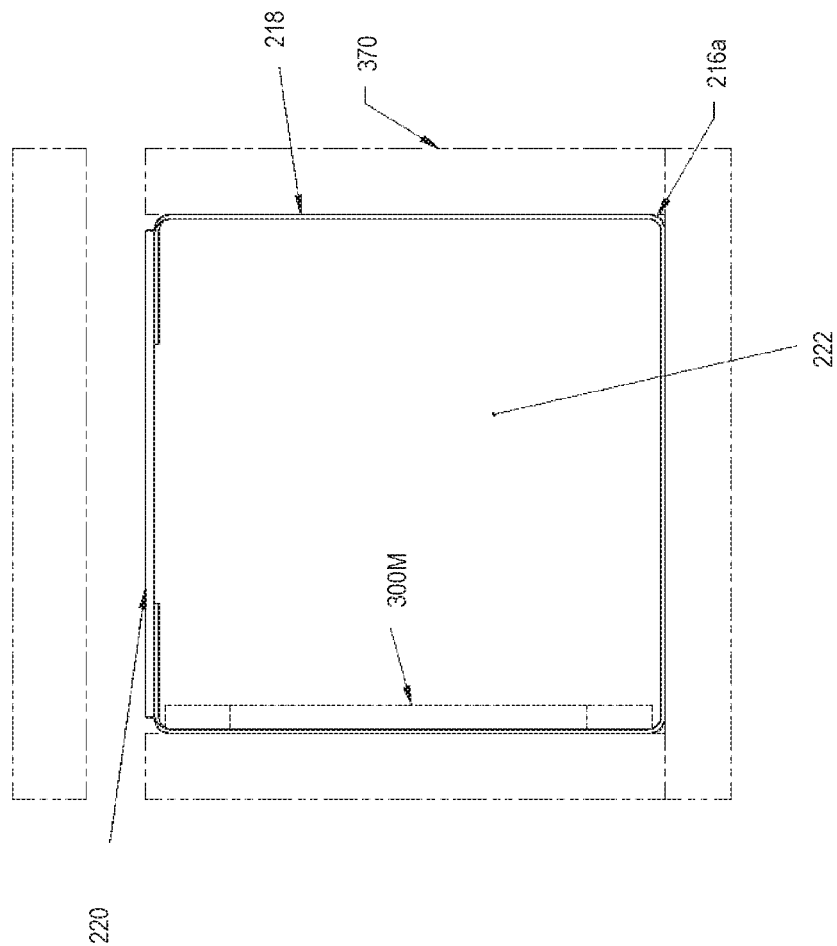
FIG. 10 is a cross-sectional view of one of the plurality of composite transverse beams of FIG. 4, with a mold shown in phantom.

Turning now to FIGS. 9 and 10, the composite structures of FIGS. 1-8 may be formed by a molding process 350, as discussed further below.

The illustrative molding process 350 involves fabricating each transverse beam 212, 214a-i, 216a-e as a preform and then incorporating the preforms into the final floor assembly 112. At step 352, a mold 370 having a desired shape is provided. At step 354, interior surfaces of mold 370 are covered with outer skins 218, 220. Outer skins 218, 220 may comprise a fiberglass fabric, for example. Moreover, outer skins 218, 220 may be of the same or different fabric weight. For example, outer skin 220 may be of a heavier fabric weight than outer skin 218. At step 356, any desired connectors 300 are placed inside outer skins 218, 220 in mold 370. With respect to the illustrative beam 216a of FIGS. 3, 5, and 6, for example, connectors 300L (not shown in FIG. 10), 300M, 300R (not shown in FIG. 10) are spaced apart from one another along the intended longitudinal length of beam 216a within mold 370. Step 356 may be omitted when forming a transverse beam 212 that lacks connectors 300. At step 358, expandable core material 222 is injected or otherwise introduced into the outer skins 216, 218 to contact connectors 300, if present. At step 360, the core material 222 expands and cures within the outer skins 216, 218 and around connectors 300, if present, which holds connectors 300 in place. At step 362, a preform resembling the desired beam 212, 214a-i, 216a-e is removed from mold 370. At step 364, the preform is incorporated into the final floor assembly 112, which may involve arranging the preform with other preforms (e.g., beam 216a of FIG. 10 may be arranged with other beams 212, 214a-i, 216b-e) and reinforcing layers, wetting the materials with at least one resin and a catalyst to impregnate and/or coat the materials, and curing the materials to form the final floor assembly 112.

The resin used to construct the composite structure may be a typical thermoset resin, a co-cure resin containing a plurality of individual co-curing resins which may be selectively distributed throughout the composite structure during the molding process, or a combination thereof. Such co-cure resins may comprise one or more elastomer components, such as urethane, co-cured with one or more resin components, such as a vinyl ester, epoxy, or unsaturated polyester components. Exemplary co-cure resins are disclosed in U.S. Pat. No. 9,371,468 and U.S. Publication No. 2016/0263873, the disclosures of which are hereby incorporated by reference in their entirety. As used herein, "co-cured" refers to the reactions involved in curing the elastomer components take place essentially concurrently with the reactions involved in curing the one or more resin components. In certain embodiments, areas of the composite structure that will be susceptible to high stress may receive a resin with a relatively higher polyurethane content for strength, whereas other areas of the composite structure that provide bulk and section modulus may receive a lower cost rigid, polyester-based resin, such as an isophthalic polyester resin.

Additional information regarding the construction of composite structures is disclosed in the following patents and published patent applications, each of which is incorporated by reference in its entirety herein: U.S. Pat. Nos. 5,429,066, 5,664,518, 5,800,749, 5,830,308, 5,897,818, 5,908,591, 6,004,492, 6,013,213, 6,206,669, 6,496,190, 6,497,190, 6,543,469, 6,723,273, 6,755,998, 6,869,561, 6,911,252, and 8,474,871, and 10,239,265.

8. Laminated Hardpoint Connectors

Figure 11:
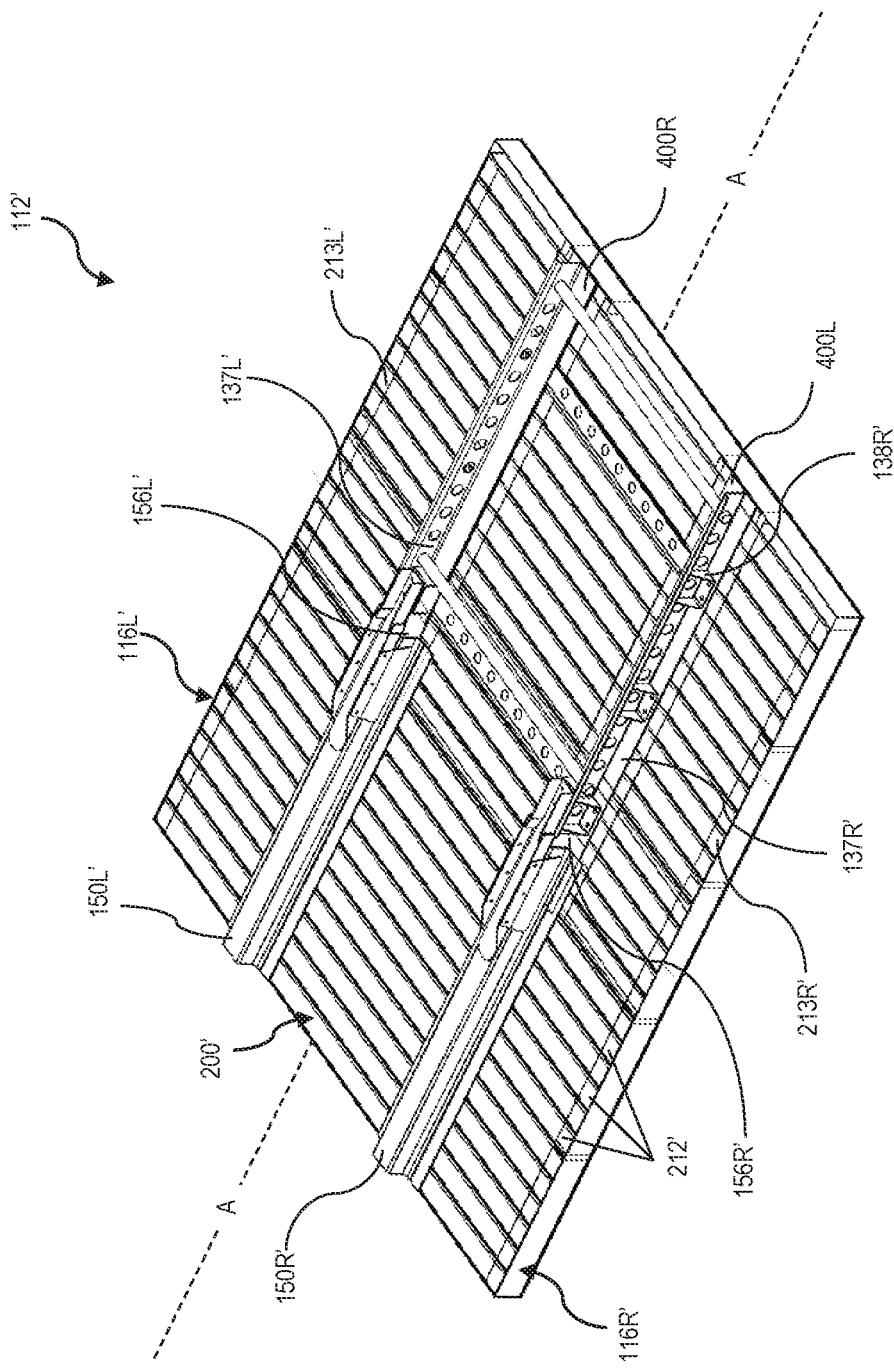
FIG. 11 is a partial perspective view of another exemplary composite floor assembly, shown with a plurality of main longitudinal beams coupled to the composite floor assembly and positioned adjacent a slide rail assembly coupled to the composite floor assembly.
Figure 12:
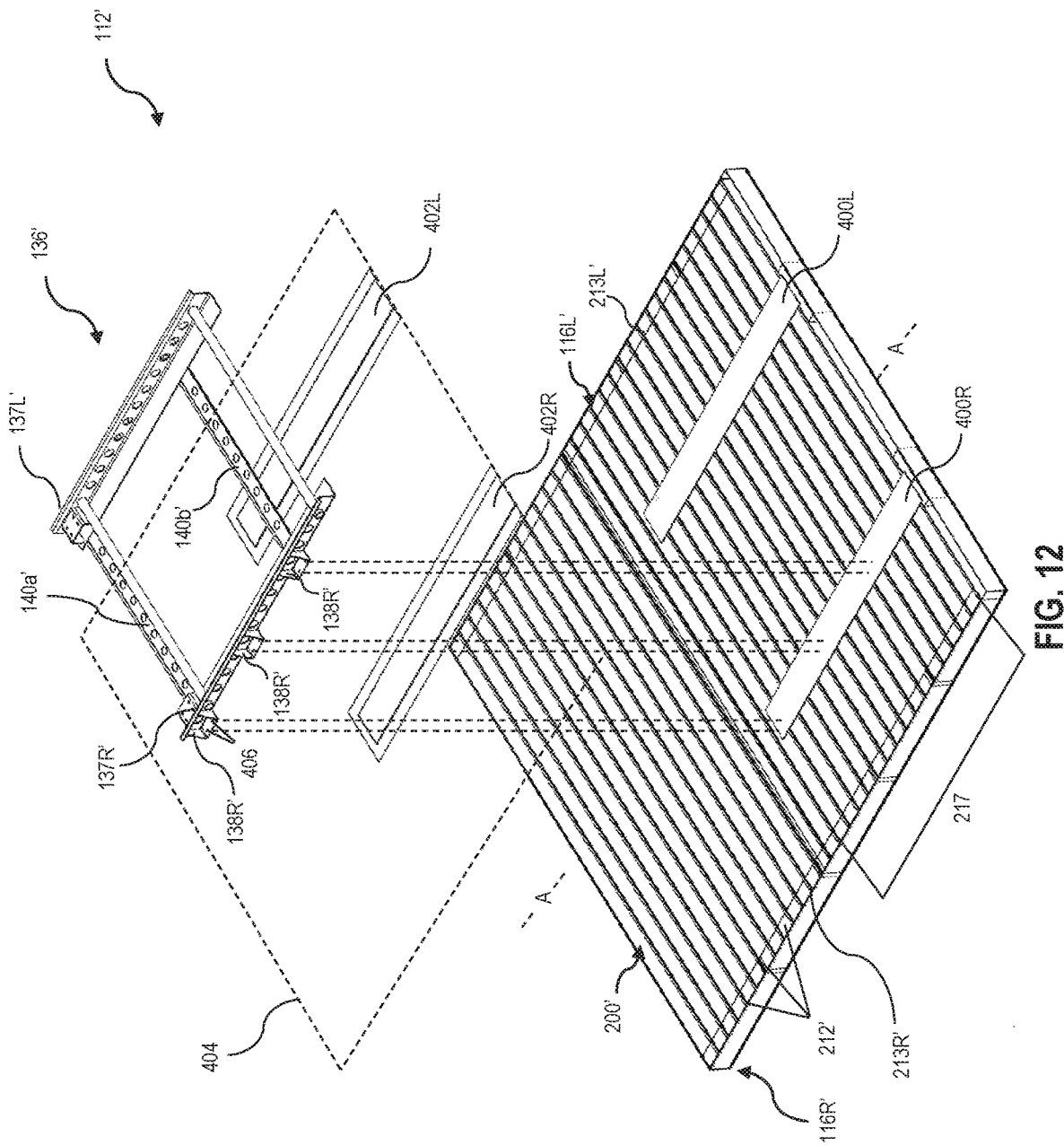
FIG. 12 is a partial perspective exploded view of the composite floor assembly of FIG. 11, with the slide rail assembly shown coupled to a first and second connector laminated to the composite floor assembly.
Figure 13:
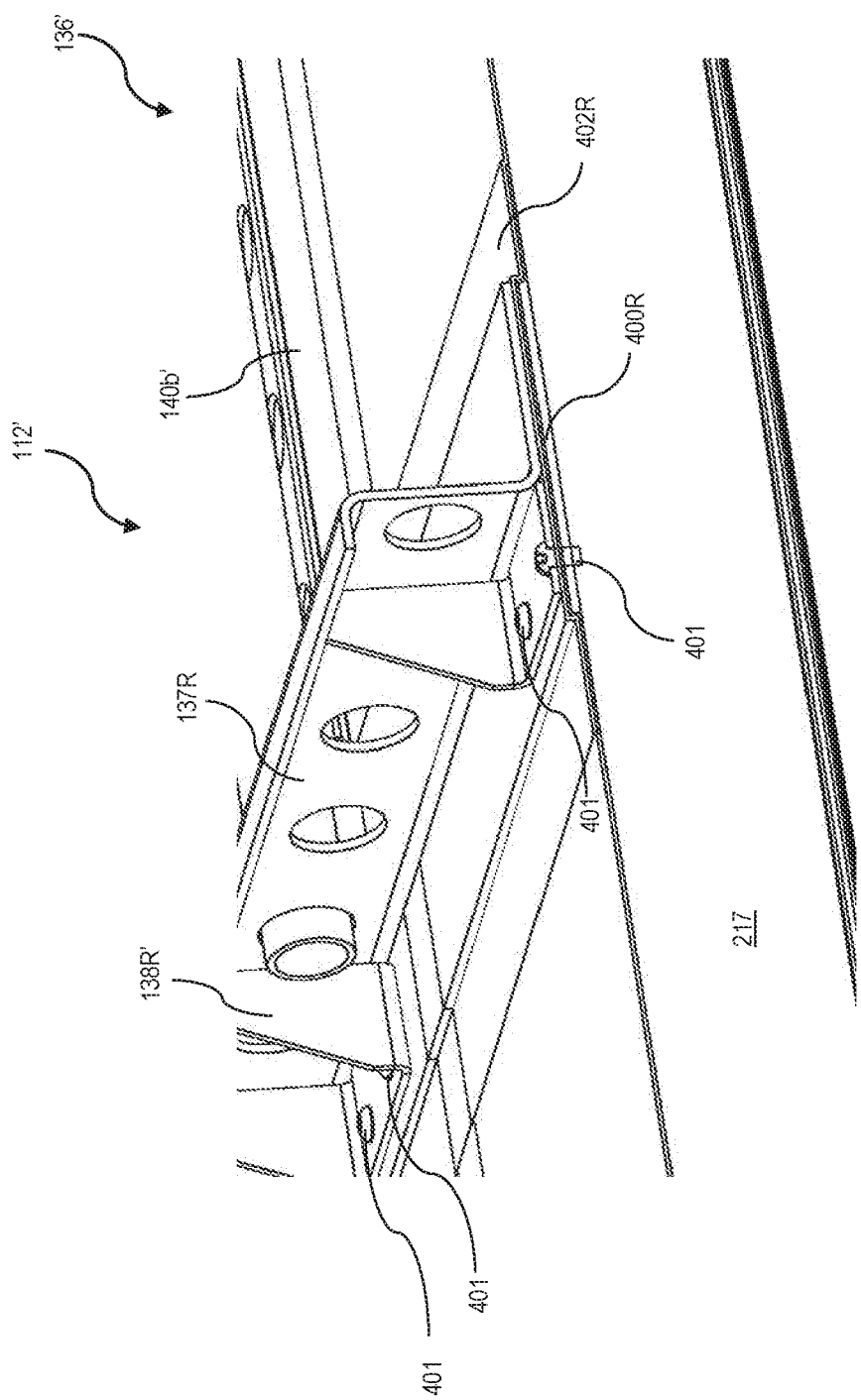
FIG. 13 is a cross-sectional view of the slide rail assembly coupled to the first connector of FIG. 12.

Turning now to FIGS. 11-13, an alternative floor assembly 112' for use in trailer 100 (see FIG. 1) is shown with a longitudinal axis A'. Floor assembly 112' may be constructed in a manner similar to floor assembly 112. That is, floor assembly 112' may comprise a plurality of transverse composite beams 212' formed from the process described in Section 7 above.

Floor assembly 112' may include one or more laminated hardpoint connectors 400. Similar to connectors 300, connectors 400 may serve as fasteners or anchors for mechanically coupling other components of trailer 100 (see FIG. 1) to floor assembly 112', such as slide rail assembly 136'.

Each connector 400 may be configured to receive one or more mechanical fasteners 401 (see FIG. 13) from the adjacent component. Suitable mechanical fasteners include bolts, screws, rivets, and nails, for example. In certain embodiments, connectors 400 may include pre-tapped holes (not shown) capable of receiving mechanical fasteners 401. Depending on the needs of the particular application, mechanical fasteners 401 may be used alone or in combination with structural adhesives. Mechanical fasteners 401 may be desired when the adjacent component will be susceptible to shear loads. When used alone, the mechanical fasteners 401 may facilitate efficient and inexpensive assembly and repairs of trailer 100. When used in combination with structural adhesive, mechanical fasteners 401 may also serve as clamps to stabilize trailer 100 during curing of the structural adhesive.

In the exemplary embodiment of FIGS. 11-13, connectors 400 are illustratively laminated or coupled to a subset of the plurality of transverse composite beams 212'. More specifically, connectors 400 are laminated across beams 217, which comprise a first subset of the plurality of beams 212'. The remaining beams 212' may lack connectors 400.

Illustratively, connectors 400 comprise a generally planar body or plate and are laminated just within lower surface 200' of floor assembly 112', more specifically across the subset of beams 217. Where beams 212', 217 comprise a composite body having a core material extending along a longitudinal length thereof, connectors 400 are positioned outwardly of the core material. Furthermore, when the core material of beams 212', 217 is at least partially surrounded by an outer skin, connectors 400 are further positioned outwardly of the outer skin. Despite being positioned outwardly from beams 212', 217, connectors 400 may be integrated into floor assembly 112' just above outer skins 402 and secured in place with cured resin, in accordance with Section 9 below.

Floor assembly 112' includes a plurality of laminated connectors 400, specifically connectors 400L, 400R. Generally, connectors 400 are oriented parallel to longitudinal axis A' and are spaced apart from one another. For example, connectors 400 may be positioned intermediate longitudinal axis A' and a respective longitudinal end 213L', 213R' of beams 217. That is, connectors 400 are positioned laterally inward of longitudinal ends 213L', 213R' of beams 217 (corresponding to lateral sidewalls 116L', 116R' of trailer 100). More specifically, connector 400L is positioned laterally intermediate longitudinal axis A' and longitudinal end 213L' and connector 400R is positioned laterally intermediate longitudinal axis A' and longitudinal end 213R'. That said, the position and number of connectors 400 may be adjusted for the required application. Moreover, the number of beams 217 spanned by connectors 400 may be more or fewer than the number of beams 217 shown in FIGS. 11 and 12.

As shown in FIGS. 12 and 13, an outer fabric layer or skin 402L covers connector 400L and an outer fabric layer or skin 402R covers connector 400R. Floor assembly 112' may also include one or more fabric layers or skins 404 (see FIG. 12) in the form of a sheet that covers beams 212', beams 217, and skins 402 to form a substantially continuous lower surface 200' of floor assembly 112' along with cured resin, in accordance with Section 9 below. As a result, connectors 400L, 400R are positioned intermediate beams 217 and lower surface 200' of floor assembly 112'.

Connectors 400 may be constructed of metallic materials (e.g., steel, aluminum, titanium), polymeric materials, wood, or composite material. In certain embodiments, connectors 400 are constructed of materials which are dissimilar from the composite material used to construct the corresponding beams. Connectors 400 may be fabricated by extrusion, pultrusion, sheet forming, roll forming, and/or casting, for example. Connectors 400 may also be single-piece or multi-piece constructs. For multi-piece constructs, the pieces may be welded, mechanically fastened, adhered, snap-fit, or otherwise coupled together.

In the exemplary embodiment shown, slide rail assembly 136' is coupled to connectors 400. Accordingly, connectors 400 and beams 217 are positioned proximate a rear end (not shown) of trailer 100. As shown FIG. 13, slide rail assembly 136' is coupled to connectors 400 using a plurality of mechanical fasteners 401. More specifically, slide rail assembly 136' includes side rails 137L', 137R' with mounting brackets 138L', 138R', respectively. Side rail 137L' is coupled to connectors 400L by inserting a plurality of mechanical fasteners 401 through holes (not shown) in mounting brackets 138L' and into connectors 400L. Similarly, side rail 137R' is coupled to connectors 400R by inserting a plurality of mechanical fasteners 401 through holes 406 in mounting brackets 138R' and into connectors 400R. Slide rail assembly 136' may be further coupled or adhered to outer skins 402L, 402R using a structural adhesive to enhance the mechanical connection.

9. Composite Molding Process with Laminated Connectors

Figure 14:
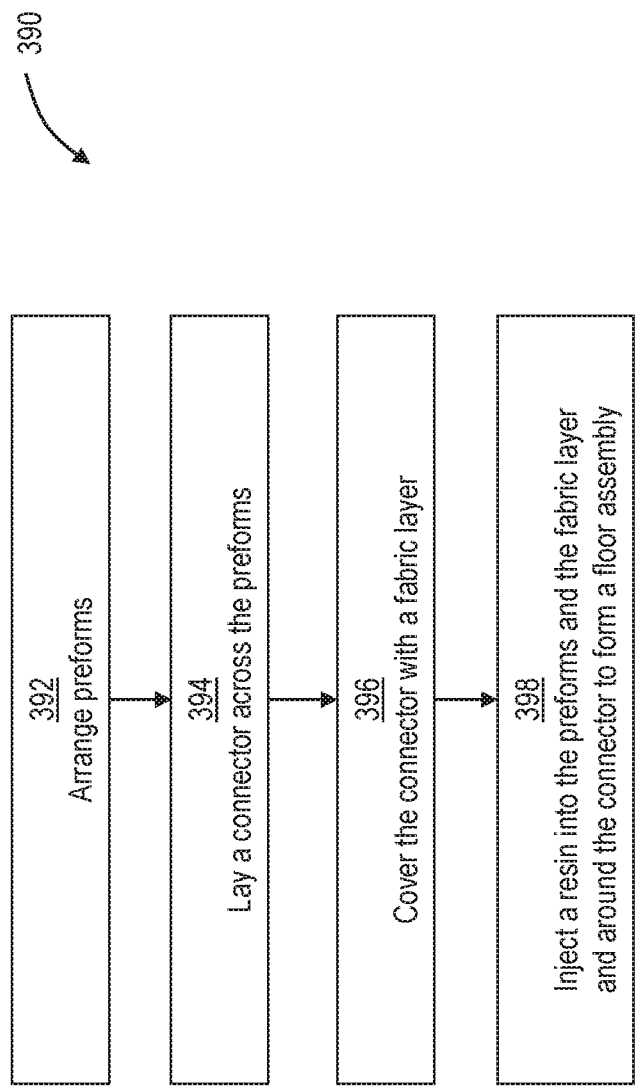
FIG. 14 is a flow chart of an exemplary method for manufacturing the composite floor assembly of FIG. 11.

Turning now to FIG. 14, the composite structures of FIGS. 11-13 may be formed by a molding process 390, as discussed further below.

The illustrative molding process 390 involves arranging a plurality of preforms, for example beams 212', and then incorporating the preforms into the final floor assembly 112'. At step 392, beams 212' formed using the method shown in steps 352, 354, 358, 360 of FIG. 9 and described Section 7 above are arranged into a composite floor assembly 112' as required by the particular application. Generally, beams 212' are arranged generally orthogonal to longitudinal axis A' of floor assembly 112'. At step 394, at least one connector 400 is laid across a subset of the beams 212', for example beams 217. Connector 400 is oriented generally parallel to longitudinal axis A'. At step 396, connector 400 is covered with one or more outer fabric layers or skins 402, 404. Outer skins 402, 404 may comprise a fiberglass fabric, for example. At step 398, beams 212' are incorporated into the final floor assembly 112' by injecting or wetting the materials with at least one resin and a catalyst to impregnate and/or coat the materials and curing the materials to form the final floor assembly 112'. More specifically, beams 212' and outer skin 402, 404 may be injected or wetted with the at least one resin and catalyst to form the final floor assembly 112'. Once cured, the resin may surround and hold connector 400 in place within floor assembly 112'.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo body, comprising:
a composite floor assembly having a first longitudinal end and a second longitudinal end, the second longitudinal end spaced apart from the first longitudinal end along a longitudinal axis, the composite floor assembly including a plurality of transverse beams;
a plurality of connectors embedded in the plurality of transverse beams;
a slide rail assembly coupled to the composite floor assembly proximate the second longitudinal end, the slide rail assembly coupled to the plurality of connectors using a plurality of mechanical fasteners, the slide rail assembly including a plurality of cross members coupled to a first longitudinal rail and a second longitudinal rail, the second longitudinal rail spaced apart from the first longitudinal rail, and the first and second longitudinal rails extending along a portion of the composite floor assembly; and
a first longitudinal beam coupled to the composite floor assembly, the first longitudinal beam oriented parallel to the longitudinal axis, the first longitudinal beam extending longitudinally from proximate the first longitudinal end to the slide rail assembly;
wherein the plurality of transverse beams includes a first subset of beams and a second subset of beams, wherein each of the beams of the first subset include a first connector and a second connector embedded therein and each of the beams of the second subset include the first connector, the second connector, and a third connector embedded therein.

2. The cargo body of claim 1, further comprising a second longitudinal beam coupled to the composite floor assembly, the second longitudinal beam oriented parallel to and spaced apart from the longitudinal axis and the first longitudinal beam, the second longitudinal beam extending longitudinally from proximate the first longitudinal end to the slide rail assembly.

3. The cargo body of claim 1, wherein the first longitudinal beam is positioned laterally inward of a first lateral side and a second lateral side of the composite floor assembly, the first longitudinal beam positioned laterally intermediate the longitudinal axis and a respective one of the first and second lateral sides.

4. The cargo body of claim 1, wherein the first longitudinal beam extends along a longitudinal length from a first longitudinal end to a second longitudinal end, the first longitudinal end of the first longitudinal beam positioned proximate the first longitudinal end of the composite floor assembly and the second longitudinal end of the first longitudinal beam positioned proximate an end of the slide rail assembly.

5. The cargo body of claim 1, wherein the slide rail assembly extends along a longitudinal length from a first longitudinal end to a second longitudinal end, the second longitudinal end of the slide rail assembly positioned proximate the second longitudinal end of the composite floor assembly and the first longitudinal end of the slide rail assembly positioned adjacent an end of the first longitudinal beam.

6. The cargo body of claim 1, wherein the first longitudinal beam includes a core material extending along a longitudinal length of the first longitudinal beam and an outer skin surrounding at least a portion of the core material.

7. The cargo body of claim 1, wherein the slide rail assembly includes a first side rail and a second side rail, the first side rail being aligned with the first longitudinal beam to form a continuous support structure beneath the floor assembly.

8. The cargo body of claim 1, wherein each of the plurality of transverse composite beams formed from a core material and an outer skin.

9. The cargo body of claim 1, wherein the first and second connectors are spaced longitudinally apart along a length of each of the second subset of beams and the third connector is positioned longitudinally intermediate the first and second connectors.

10. The cargo body of claim 1, wherein the first longitudinal rail is coupled to each of the first connectors, the second longitudinal rail is coupled to each of the second connectors, and the plurality of cross members are coupled to the third connectors.

11. The cargo body of claim 1, wherein the plurality of transverse beams are oriented generally orthogonal to the longitudinal axis of the composite floor assembly.

12. A method of manufacturing a composite floor assembly with at least one laminated connector, the method comprising:
 providing a mold having a plurality of interior surfaces;
 covering the plurality of interior surfaces with at least one outer beam skin
 introducing an expandable core material into the at least one outer beam skin;
 expanding the core material in the at least one outer beam skin to form a composite beam;
 arranging the composite beam with a plurality of additional composite beams to form a composite floor assembly, the plurality of composite beams oriented generally orthogonal to a longitudinal axis of the composite floor assembly;
 laying a first connector across at least a subset of the plurality of composite beams, the first connector arranged generally parallel to the longitudinal axis;
 covering the first connector with an outer floor skin; and
 injecting a resin into the plurality of composite beams and the outer floor skin and around the first connector.

13. The method of claim 12, wherein the expandable core material is a foam.

14. The method of claim 12, wherein the laying step further includes laying a second connector across the subset of the plurality of composite beams, the second connector arranged generally parallel to the longitudinal axis and spaced apart from the first connector.

* * * * *